United States Patent [19]
Groth et al.

[11] Patent Number: 6,100,319
[45] Date of Patent: Aug. 8, 2000

[54] PROCESS FOR IMPROVING THE PLASTICITY OF CERAMIC COMPOSITION AND FOR REVERSING THIS EFFECT

[75] Inventors: Torsten Groth, Odenthal; Winfried Joentgen, Köln; Bernhard Lehmann, Aachen; Ralf Moritz, Neuss; Ulrich Litzinger, Hachenburg; Rüdiger Schubart, Bergisch Gladbach; Thomas Menzel, Hilden, all of Germany

[73] Assignee: Bayer Aktiengesellschaft, Leverkusen, Germany

[21] Appl. No.: 09/151,345

[22] Filed: Sep. 11, 1998

[30] Foreign Application Priority Data

Sep. 17, 1997 [DE] Germany ............... 197 40 787

[51] Int. Cl.$^7$ ...................................... C08K 5/09
[52] U.S. Cl. ................................. 524/321; 524/2
[58] Field of Search ......................... 524/2, 321

[56] References Cited

U.S. PATENT DOCUMENTS

| | | | |
|---|---|---|---|
| 2,839,417 | 6/1958 | Tousignant | 106/287.23 |
| 3,491,049 | 1/1970 | Gibson et al. | 425/194 |
| 4,569,694 | 2/1986 | Spitz et al. | 524/2 |
| 4,839,461 | 6/1989 | Bochmke | 528/363 |
| 4,980,507 | 12/1990 | Mizui et al. | 564/482 |
| 5,266,237 | 11/1993 | Freeman et al. | 510/220 |
| 5,266,305 | 11/1993 | Wood et al. | 424/54 |
| 5,286,810 | 2/1994 | Wood | 525/421 |
| 5,503,771 | 4/1996 | Staley et al. | 516/78 |
| 5,656,646 | 8/1997 | Perner et al. | 524/321 |
| 5,859,149 | 1/1999 | Martin | 525/420 |
| 5,908,885 | 6/1999 | Sikes et al. | 524/5 |

FOREIGN PATENT DOCUMENTS

| | | |
|---|---|---|
| 786 487 | 7/1997 | European Pat. Off. |
| 2 351 754 | 10/1973 | Germany. |
| 2 833 654 | 1/1978 | Germany. |
| 196 03 052 | 7/1997 | Germany. |
| 7/172888 | 11/1995 | Japan. |
| 08/169741 | 2/1999 | Japan. |
| 1 430 906 | 10/1974 | United Kingdom. |

OTHER PUBLICATIONS

J. Org. Chem vol. 26 Chemical Studies of Polyasparric Acids pp. 1084–1091 (1961).
Tsuchida et al, Macromolecular Complexes in Chemistry and Biology, edited by Dubin, Springer–Verlag, 1994.
Patent Abstracts of Japan, vol. 96, No. 11, Nov. 29, 1996 & JP 08 169741 A (Mitsui Toatsu Chem. Inc.), Jul. 2, 1996.
Patent Abstracts of Japan, vol. 95, No. 10, Nov. 30, 1995 & JP 07 172888 A (Mitsui Toatsu Chem. Inc.), Jul. 11, 1995.

*Primary Examiner*—David W. Wu
*Assistant Examiner*—Ling-Siu Choi
*Attorney, Agent, or Firm*—Connolly, Bove, Lodge & Hutz LLP

[57] ABSTRACT

The plasticity of ceramic compositions and dispersions can be improved by addition of at least one polymer (I) with recurring succinyl units. This effect can be reversed by addition of a setting accelerator (II); preferred setting accelerators are polymers (II) of the polyalkylenepolyamine type.

10 Claims, No Drawings

PROCESS FOR IMPROVING THE PLASTICITY OF CERAMIC COMPOSITION AND FOR REVERSING THIS EFFECT

The present invention relates to a new process for improving the plasticity of ceramic compositions by addition of auxiliary substances and for reversing the effect by addition of further auxiliary substances. This is understood as meaning improving the dispersion, stabilization and rheological properties, in particular the plasticity, of ceramic compositions, comprising clay minerals and their carbides, nitrides, oxides and silicates, of ceramic pigments and of hydraulic binders, such as cement or concrete, as the phase to be dispersed and water as the dispersing agent, and reversing this effect in the sense of solidification of such dispersions.

During the preparation of such compositions, e.g. during pulverizing or grinding, during transportation and during storage or processing it is appropriate and necessary to prepare plastic compositions (so-called slurries or slips). Other such compositions are ceramic materials, ceramic pigments inter alia, which do not set themselves and to which hydraulic binders are added. To avoid possible flocculation or sedimentation, to increase the ductility or plasticity at the same or a lower water content and to improve the nature of the ceramic end products, it is known to add stabilizing, dispersing and liquefying agents. Soda- or sodium-water glass solutions, oleic acids and stearic acids, products based on hydroxy- or polyhydroxycarboxylic acids or carboxylic acid esters, alkyl polyglycol ethers, triethanolaminesulfonates and products based on ligninsulfonates are known for this. Known additives are furthermore sucrose, glucose, polyalcohols, adipic, citric, lactic, tartaric, malonic or fumaric acid and inorganic phosphorus compounds, such as ortho-, meta-, pyro- or polyphosphates, as well as hydrophilic melamineformaldehyde resins, ligninsulfonates, sulfite waste lye, protein degradation products and humic acids.

JP 07/172 888 describes the use of polyaspartic acid Na salt with an average molecular weight MW=31,000 as a flow improver. JP 08/169 741 describes the use of polysuccinimide of MW=78,000 as a flow improver.

The present invention was based on the object of providing a polymer (I) which improves the rheological properties of ceramic compositions, is distinguished, in particular, by an improved biodegradability, and the effect of which on ceramic compositions is cancelled out and reversed by a setting accelerator (II).

A process has been found for improving the plasticity of ceramic compositions and dispersions having a content of water and for reversing this effect, which is characterized in that, to improve the plasticity, an amount of 0.1 to 5 wt. %, based on the weight of the water content, of at least one polymer (I) with recurring succinyl units and, to reverse this effect, an amount of 0.01 to 1 wt. %, based on the weight of the water content, of at least one setting accelerator (II), which neutralizes the ionic and interface-specific effects of the polymers (I), are added.

The polymers (I) used according to the invention contain recurring succinyl units with at least one of the following structures:

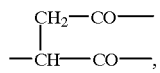

preferably nitrogen-containing

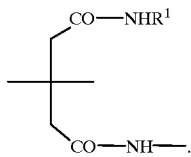

Specifically, these are

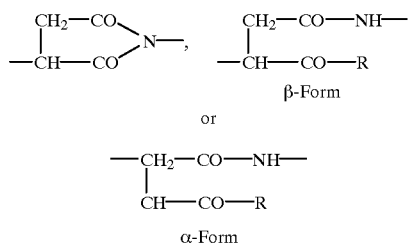

in which

R represents OH, OLi, ONa, OK, $ONH_4$, $NH_2$, $NHR_1$ or $OR^1$, wherein $R^1$ denotes one of the substituents

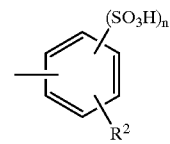

or —Y—$SO_3$H, wherein n represents the number 1 or 2, Y represents straight-chain or branched alkylene, alkenylene or alkinylene and $R^2$ represents hydrogen, alkyl, alkoxy or halogen.

Alkyl has 1–6, preferably 1–2 C atoms and is, for example, methyl, ethyl, propyl, i-propyl, butyl, i-butyl, pentyl or hexyl. Alkylene is derived therefrom by removing an H atom, and is divalent; alkenylene has 2–6, preferably 2 C atoms and a double bond and, analogously to the alkylene, is divalent; alkinylene has a triple bond and is otherwise similar to the alkenylene.

Alkoxy is an alkyl bonded via an ether oxygen atom.

Halogen is fluorine, chlorine or bromine, preferably chlorine.

In addition, further recurring units can be present by a suitable reaction procedure and choice of the educts, e.g.

a) malic acid units of the formula

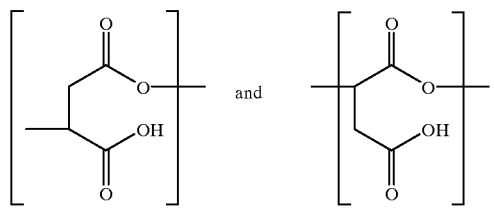

b) maleic acid and fumaric acid units of the formula

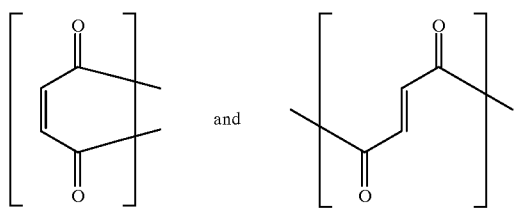

In a particularly preferred embodiment, the polymer (I) to be used according to the invention is a polyaspartic acid.

The preparation and use of polyaspartic acid (PAA) and its derivatives has long been the subject matter of numerous publications and patents. The preparation can be carried out, for example, by thermal polycondensation of aspartic acid in accordance with J. Org. Chem. 26, 1084 (1961). Polysuccinimide (PSI), which is referred to therein as "anhydropolyaspartic acid" first occurs as an intermediate. PSI can be converted into PAA by hydrolysis. U.S. Pat. No. 4,839,461 describes the preparation of polyaspartic acid from maleic anhydride, water and ammonia generally, and U.S. Pat. No. 5,286,810 specifically at higher temperatures.

In many preparation processes, it is not the pure acids but initially the corresponding anhydrides, for example polysuccinimide (PSI), which are first obtained. Such polymerization products can be converted into a PAA-containing salt by reaction with a base, optionally in the presence of water. This conversion of PSI-containing polymers into PAA-containing polymers then takes place by hydrolysis in a suitable device. A pH of between 5 and 14 is preferably suitable for this. In a particularly preferred form, a pH of 7 to 12 is chosen, in particular by the addition of a base. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine and further substituted amines. In addition to free PAA acids, their Na, K or Ca salts are particularly preferred as polymers (I). The temperature during the hydrolysis is advantageously in a range up to the boiling point of the PSI suspension, for example at 20 to 150° C. Optionally, the hydrolysis is carried out under pressure. However, it is also possible to obtain the free polyaspartic acid by purely aqueous hydrolysis or treatment of the PAA salt with acids or acid ion exchangers. The term "polyaspartic acid" (PAA) in the present invention also includes the salts, if not expressly stated otherwise. The finished product is obtained by drying, preferably spray drying.

Preferred polymers (I) have a molecular weight, according to analyses by gel permeation chromatography, of Mw=500 to 10,000, preferably 700 to 5,000, particularly preferably 1,000 to 4,500. In general, the content of the beta form in polyaspartic acids is more than 50%, preferably more than 70%, based on the sum of these units.

In another preferred form, the polymers (I) to be used according to the invention are modified polyaspartic acids which are obtained by reaction of
  a) 0.1–99.9 mol % PAA or PSI or 0.1–99.9 mol % aspartic acid with
  b) 99.9–0.1 mol % fatty acids, fatty acid amides, polybasic carboxylic acids, their anhydrides and amides, polybasic hydroxycarboxylic acids, their anhydrides and amides, polyhydroxycarboxylic acids, aminocarboxylic acids, sugar-carboxylic acids, alcohols, polyols, amines, polyamines, alkoxylated alcohols and amines, amino-alcohols, amino-sugars, carbohydrates, ethylenically unsaturated mono- and polycarboxylic acids and their anhydrides and amides, protein hydrolysis products, e.g. maize protein hydrolysis products and soya protein hydrolysis products, aminosulfonic acids and aminophosphonic acids.

In a preferred embodiment, the polymer (I) to be used according to the invention is added to the system in a concentration of 0.1 to 5 wt. %, based on the aqueous phase. Particularly preferred amounts are 0.3 to 3 wt. %.

It is also possible to use further additives, such as wetting agents, lubricating auxiliaries, further plasticizing agents and other conventional additives, in addition to the polymers (I) used according to the invention. Concretes, mortars etc. and optionally air pore-forming agents and/or thixotropic agents can also be added to the ceramic compositions prepared using the liquefiers (I) described.

There is often the desire to reverse the liquefaction necessary for transportation and handling. However, this is not the case exclusively, for example, in the processing of ready-mixed concrete. An optimum homogeneity and plasticity is desirable for filling out very fine channels, for transportation by pumping, for pressing out foundation structures, for compacting fine-membered components, for preparing dense bulk concrete or for centrifuging high-grade centrifugal concretes. After the introduction, however, the plasticity should be reversed rapidly in the sense that the consistency increases significantly and the concrete loses its flow properties, sets and solidifies, during which it achieves its final desired properties, such as its strength.

According to the invention, to reverse the plasticizing of ceramic compositions and dispersions which have been plasticized by a polymer (I), a setting accelerator (II) which neutralizes and reverses the ionic and interface-specific effects of the polymer (I) is added.

Setting accelerators, which are added to the ceramic compositions and dispersions shortly before their final processing, are, for example, soluble alkali/alkaline earth metal salts, alkali metal aluminates, alkali metal silicates or a mixture of several of these or, preferably, a polyalkylenepolyamine, called polymer (II) here.

A suitable polymer (II) can be prepared, for examples, by first reacting ammonia with dichloroalkylenes and reacting the products obtainable by this process, e.g. diethylenetriamine, with further dichloroalkylene. Mixtures of polyalkylene-polyamines of various origin can also be employed. The alkylene groups are straight-chain or branched and have 2 to 4 C atoms, for example 1,2-ethylene, 1,2- and 1,3-propylene and 1,2-, 1,3- and 1,4-butylene. 1,2-Ethylene and 1,2-propylene are preferred, and 1,2-ethylene is particularly preferred. Optionally, the polyalkylenepolyamines primarily accessible in this way can be heated under reduced pressure to reduce vinyl chloride contents to below the detection limit in aqueous solution and/or, optionally, they can be degraded by heat under increased pressure to lower the viscosity (DE-OS 2 351 754 and DE-OS 2 833 654). The chloride from the dichloroalkylenes forms the counter-ion to the amino groups formed during the reaction. A specific degree of neutralization can be established by addition of further hydrochloric acid. Chloride can also be replaced by sulfate, phosphate or acetate in a known manner. Particularly suitable polyalkylenepolyamines have e.g. viscosities in the range from 200 to 800 mPa.s (measured as a 25 wt. % aqueous solution at 25° C.). Polyalkylenepolyamines such as are obtained during their preparation, i.e. as a solution in water, can also be employed.

Polyethylenepolyamines which have a molecular weight of 80,000 to 120,000, a viscosity of 250 to 400 mPa.s (measured in 25 wt. % aqueous solution at 25° C.) and the lowest possible risk to water are preferably employed.

Setting accelerators (II), in particular the polymers (II), are employed in amounts of 0.01 to 1 wt. %, preferably 0.01 to 0.2 wt. %, based on the weight of the aqueous phase.

EXAMPLES

Examples 1 to 4 show the improvement in the plasticity and example 5 shows the reversal of this phenomenon.

Example 1

60 g China clay were stirred at room temperature with 40 ml of an aqueous solution of the stated liquefying agents A to E in graduated concentrations and the mixture was then homogenized for 10 minutes at 750 revolutions per minute with a propeller stirrer such that suspensions (slurries) comprising 60 wt. % solids and 0.1 to 1.0 wt. % liquefying agent were formed. The flow curves of the slurries were then recorded with a rotary viscometer type Haake RV 12. The liquefying agents employed were:

Agent A: Commercially obtainable polyacrylic acid (mol. wt. MW=3,000)
Agent B: Commercially obtainable acrylic acid/maleic acid copolymer (MW=4,000)
Agent C: Polyaspartic acid (MW=1,800)
Agent D: Polyaspartic acid (MW=2,400)
Agent E: Polyaspartic acid (MW=8,000)

Table 1 shows the results.

Example 2

The procedure was as above, but 60 ml of an aqueous solution of agents A to E were added to 50 g secondary fine kaolin. Table 2 shows the results.

Example 3

The procedure was as above, but 45 ml of an aqueous solution of agents A to E were added to 55 g fine talc. Table 3 shows the results.

TABLE 1

China clay slurries with 60% solids content; 0.1, 0.2, 0.3, 0.4 and 1.0 wt. % agents A to E

| Shear rate | 0.1% | 0.2% | 0.3% | 0.4% | 1.0% |
|---|---|---|---|---|---|
| Agent A | | | | | |
| 10 | 111560 | 38010 | 875 | 72.5 | 121.1 |
| 20 | 66520 | 24550 | 525 | 65.6 | 98.4 |
| 40 | 43550 | 13260 | 284 | 54.7 | 78.8 |
| 80 | 25320 | 7720 | 164 | 32.8 | 62.3 |
| 160 | 18430 | 4800 | 115 | 24.6 | 61.5 |
| 320 | 10210 | 3120 | 115 | 15.0 | 60.3 |
| Agent B | | | | | |
| 10 | 118781 | 2800 | 70.1 | 70.1 | 152.1 |
| 20 | 74440 | 1530 | 65.6 | 65.6 | 131.3 |
| 40 | 47512 | 830 | 54.7 | 54.7 | 98.4 |
| 80 | 28320 | 635 | 49.2 | 38.3 | 82.0 |
| 160 | 20360 | 545 | 43.8 | 38.3 | 70.5 |
| 320 | 14230 | 485 | 49.2 | 43.8 | 65.6 |
| Agent C | | | | | |
| 10 | 63350 | 36426 | 2450 | 87.5 | 69.1 |
| 20 | 58600 | 19790 | 1422 | 65.6 | 65.6 |
| 40 | 38010 | 10490 | 820 | 54.7 | 62.3 |

TABLE 1-continued

China clay slurries with 60% solids content; 0.1, 0.2, 0.3, 0.4 and 1.0 wt. % agents A to E

| Shear rate | 0.1% | 0.2% | 0.3% | 0.4% | 1.0% |
|---|---|---|---|---|---|
| 80 | 22350 | 6137 | 519 | 32.8 | 62.3 |
| 160 | 13210 | 3810 | 372 | 24.6 | 45.1 |
| 320 | 10220 | 2524 | 355 | 15.0 | 32.4 |
| Agent D | | | | | |
| 10 | 79180 | 20590 | 1487 | 131.3 | 72.1 |
| 20 | 50680 | 11870 | 787 | 109.4 | 65.6 |
| 40 | 27110 | 6530 | 415 | 76.7 | 52.5 |
| 80 | 16629 | 4250 | 235 | 60.2 | 55.8 |
| 160 | 9403 | 2670 | 218 | 60.2 | 59.1 |
| 320 | 5920 | 1730 | 210 | 62.9 | 65.6 |
| Agent E | | | | | |
| 10 | 106110 | 61760 | 2012 | 87.5 | 181.9 |
| 20 | 69685 | 39590 | 1094 | 87.5 | 150.9 |
| 40 | 46720 | 22960 | 602 | 65.6 | 105.5 |
| 80 | 30120 | 13165 | 339 | 54.7 | 87.1 |
| 160 | 20850 | 8020 | 191 | 52.0 | 77.1 |
| 320 | 16210 | 4700 | 172 | 57.4 | 72.2 |

TABLE 2

Secondary fine kaolin as a slurry with 50% solids content; 0.1 to 0.3 wt. % agents A to E)

| Shear rate | 0.10% | 0.15% | 0.20% | 0.30% |
|---|---|---|---|---|
| Agent A | | | | |
| 10 | 39260 | 4216 | 2523 | 722 |
| 20 | 22960 | 3167 | 1816 | 547 |
| 40 | 13060 | 1781 | 1050 | 328 |
| 80 | 7720 | 1039 | 612 | 219 |
| 160 | 4550 | 594 | 372 | 126 |
| 320 | 2800 | 371 | 137 | 79 |
| Agent B | | | | |
| 10 | 10620 | 498 | 112 | 82.1 |
| 20 | 7920 | 328 | 87.5 | 72.5 |
| 40 | 4750 | 175 | 65.6 | 65.2 |
| 80 | 2770 | 104 | 43.8 | 43.8 |
| 160 | 1680 | 60 | 35.5 | 34.5 |
| 320 | 1340 | 37 | 31.4 | 30.9 |
| Agent C | | | | |
| 10 | 43560 | 14280 | 982 | 113.2 |
| 20 | 31670 | 9800 | 678 | 109.4 |
| 40 | 19890 | 5350 | 382 | 98.4 |
| 80 | 12370 | 3070 | 202 | 76.7 |
| 160 | 6680 | 1730 | 109 | 54.7 |
| 320 | 3910 | 1040 | 66 | 41.1 |
| Agent D | | | | |
| 10 | 38960 | 9880 | 716 | 148.3 |
| 20 | 27710 | 7910 | 612 | 109.4 |
| 40 | 17820 | 4350 | 484 | 65.6 |
| 80 | 10390 | 2370 | 262 | 43.8 |
| 160 | 5940 | 1330 | 150 | 24.6 |
| 320 | 3360 | 866 | 90 | 19.1 |
| Agent E | | | | |
| 10 | 34260 | 6230 | 2780 | 46.2 |
| 20 | 23750 | 4750 | 1970 | 43.8 |
| 40 | 13860 | 2570 | 1050 | 43.8 |
| 80 | 7920 | 1480 | 574 | 32.8 |
| 160 | 4700 | 792 | 317 | 21.9 |
| 320 | 2920 | 470 | 177 | 16.4 |

TABLE 3

Fine talc as a slurry with 55% solids content; 0.1 to 0.4 wt. % agents A to E)

| Shear rate | 0 Sample | 0.1% | 0.2% | 0.3% | 0.4% |
|---|---|---|---|---|---|
| | | Agent A | | | |
| 80 | 71.1 | 26.2 | 19.3 | 12.3 | 11.5 |
| 160 | 120.3 | 38.3 | 30.1 | 24.6 | 24.6 |
| 320 | 191.4 | 76.6 | 68.4 | 53.3 | 52.0 |
| 660 | 382.4 | 129.9 | 129.9 | 109.4 | 102.5 |
| | | Agent B | | | |
| 80 | 71.1 | 65.5 | 38.3 | 16.4 | 10.9 |
| 160 | 120.3 | 93.0 | 76.6 | 43.8 | 38.3 |
| 320 | 191.4 | 169.5 | 151.8 | 95.7 | 65.6 |
| 660 | 382.4 | 177.7 | 143.6 | 123 | 109.4 |
| | | Agent C | | | |
| 80 | 71.1 | 54.7 | 33.6 | 8.22 | 14.0 |
| 160 | 120.3 | 82.0 | 49.2 | 43.8 | 24.6 |
| 320 | 191.4 | 157.2 | 106.6 | 95.7 | 60.2 |
| 660 | 382.4 | 205.1 | 141.1 | 123.3 | 123.1 |
| | | Agent D | | | |
| 80 | 71.1 | 54.7 | 43.8 | 16.4 | 10.9 |
| 160 | 120.3 | 101.2 | 73.8 | 49.2 | 54.7 |
| 320 | 191.4 | 183.2 | 157.2 | 109.4 | 71.1 |
| 660 | 382.4 | 205.1 | 170.9 | 150.4 | 123.3 |
| | | Agent E | | | |
| 80 | 71.1 | 27.3 | 27.3 | 32.8 | 32.8 |
| 160 | 120.3 | 54.7 | 54.7 | 57.4 | 52.0 |
| 320 | 191.4 | 108 | 118.9 | 127.1 | 110.7 |
| 660 | 382.4 | 109.9 | 171.2 | 164.1 | 150.4 |

TABLE 4

Slump of cement slurries

| Test duration [min] | 0 sample (duplicate det.) | 0.25% | 0.50% | 0.75% | 1.00% |
|---|---|---|---|---|---|
| | | Active compound C | | | |
| 30 | 152 | 164 | 172 | 176 | 175 |
| 60 | 147 | 169 | 166 | 179 | 179 |
| 90 | 138 | 160 | 167 | 178 | 180 |
| 120 | 135 | 155 | 167 | 174 | 175 |
| 180 | 130 | 145 | 160 | 166 | 175 |
| 240 | solid | 139 | 145 | 162 | 172 |
| 300 | | 111 | 113 | 142 | 150 |
| 360 | | solid | solid | 110 | 120 |
| | | Active compound D | | | |
| 30 | 145 | 165 | 176 | 170 | 178 |
| 60 | 138 | 165 | 173 | 173 | 178 |
| 90 | 135 | 165 | 170 | 170 | 173 |
| 120 | 133 | 160 | 169 | 172 | 172 |
| 180 | 107 | 157 | 157 | 172 | 174 |
| 240 | solid | 161 | 161 | 174 | 173 |
| 300 | | 157 | 158 | 169 | 173 |
| 360 | | 150 | 150 | 165 | 173 |
| | | Active compound E | | | |
| 30 | 143 | 141 | 154 | 155 | 163 |
| 60 | 143 | 143 | 154 | 155 | 163 |
| 90 | 140 | 145 | 155 | 155 | 165 |
| 120 | 138 | 145 | 157 | 156 | 170 |
| 180 | 125 | 148 | 156 | 156 | 170 |
| 240 | solid | 158 | 155 | 155 | 168 |
| 300 | | 158 | 158 | 158 | 165 |
| 360 | | 144 | 156 | 156 | 162 |

Example 4

The plasticity of fresh concrete can be improved with the polymers (I) according to the invention. This results not only in the advantage of the effect as a liquefier, but (I), as a dispersing agent, also counteracts demixing during transportation and processing. Testing in this context was carried out in accordance with DIN 1048 T1 (test method for fresh concrete): A slump table with an area of 200×200 mm was fixed to a perpendicular guide such that a free fall height of 100 mm was ensured. A cylindrical mould standing centrally on the matt-damp surface of the slump table was filled loosely with the freshly prepared and homogenized mortar. After the mould had been filled, the excess was scraped off flush without a compacting effect, and the mould was raised and placed on one side.

Within 15 s, the plate was now raised to the stop and allowed to fall freely 15 times without jerking. The diameter of the mortar cake was then measured. The experiment was repeated after 1 h, in order to record the setting properties as a function of time in this manner.

Test conditions:

Portland cement CEMI 32.5 R DIN 1164

Water/cement ratio: 0.325

Concentration: 0.25/0.5/0.75/1 wt. % plasticizing agent

Agent C: Polymer (I) MW 1,800

Agent D: Polymer (I) MW 2,400

Agent E: Polymer (I) MW 8,000

Example 5

The highly liquefying effect of the polymer I shown in examples 1 to 4 could be rtually completely by subsequent addition of a polymer (II). First 0.4% polymer I and then 0.01–0.05% polymer (II) were added to the liquefied kaolin according to example 2.

| Sample | Viscosity [mPa · s] |
|---|---|
| Zero sample | 6,000 |
| plus 0.4% polymer (I) | 23 |
| (I) plus 0.01% polymer (II) | 46 |
| (I) plus 0.02% polymer (II) | 1,900 |
| (I) plus 0.025% polymer (II) | 2,400 |
| (I) plus 0.05% polymer (II) | 5,600 |

We claim:

1. Process for improving the plasticity of ceramic compositions and dispersions having a content of water and for reversing this effect, characterized in that, to improve the plasticity, an amount of 0.1 to 5 wt. %, based on the weight of the water content, of at least one polymer with recurring succinyl units (I) and, to reverse this effect, subsequently adding an amount 0.01 to 1 wt. %, based on the weight of the water content, of at least one setting accelerator (II), which neutralizes the ionic and interface-specific effects of the polymers (I).

2. Process according to claim 1, characterized in that the polymer (I) contains recurring units of at least one of the following structures

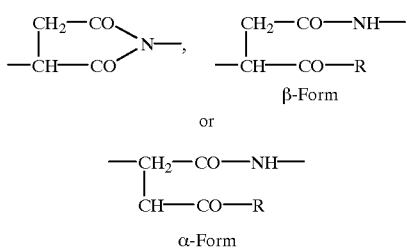

β-Form or

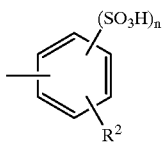

α-Form in which
R represents OH, OLi, ONa, OK, ONH$_4$, NH$_2$, NHR$^1$ or OR$^1$, wherein R$^1$ denotes one of the substituents (SO$_3$H)$_n$, R$^2$ (on benzene ring)

or —Y—SO$_3$H,
wherein n represents the number 1 or 2, Y represents straight-chain or branched alkylene, alkenylene or alkinylene and R$^2$ represents hydrogen, alkyl, alkoxy or halogen.

3. Process according to claim 1, characterized in that the polymer (I) is a polyaspartic acid or a polysuccinimide or one of their salts.

4. Process according to claim 1, characterized in that the polymer (I) has a molecular weight of Mw=500 to 10,000, preferably 700 to 5,000, particularly preferably 1,000 to 4,500.

5. Process according to claim 1, characterized in that the polymer (I) is employed in an amount of 0.1 to 5 wt. %, based on the aqueous phase.

6. Process according to claim 1, characterized in that a setting accelerator (II) which comprises several polyalkylenepolyamines, preferably polyethylenepolyamines, with viscosities in the range from 200 to 800 mPa.s, measured as a 25 wt. % aqueous solution at 25 ° C., is employed as the setting accelerator.

7. Process according to claim 1, characterized in that the setting accelerator (II) is employed in an amount of 0.01 to 1 wt. %.

8. Process according to claim 1, characterized in that the setting accelerator (II) is a polyethylenepolyamine salt which is obtained by reaction of ammonia with dichloroethylene.

9. Process according to claim 1, wherein said polymer (I) is the reaction product of a) with b) wherein said a) and b) are as follows:
a) 0.1 to 99.9 mol % polyaspartic acid or polysuccinimide or 0.1 to 99.9 mol % aspartic acid,
b) 99.9 to 0.1 mol % fatty acids, fatty acid amides, polybasic carboxylic acids, polybasic carboxylic acid anhydrides, polybasic carboxylic acid amides, polybasic hydroxycarboxylic acids, polybasic hydroxycarboxylic acid anhydrides, polybasic hydroxycarboxylic acid amides, polyhydroxycarboxylic acids, aminocarboxylic acids, sugar-carboxylic acids, alcohols, polyols, amines, polyamines, alkoxylated alcohols, akloxylated amines, amino-alcohols, amino-sugars, carbohydrates, ethylenically unsaturated monocarboxylic acid, ethylenically unsaturated polycarboxylic acids, ethylenically unsaturated monocarboxylic acid anhydrides, ethylenically unsaturated polycarboxylic acids anhydrides, ethylenically unsaturated mono-carboxylic acid amides, ethylenically unsaturated polycarboxylic acids amides, protein hydrolysis products, aminosulfonic acids or aminophosphonic acids.

10. The process as claimed in claim 9, wherein said protein hydrolysis products are maize protein hydrolysis products or soya protein hydrolysis products.

* * * * *

UNITED STATES PATENT AND TRADEMARK OFFICE
CERTIFICATE OF CORRECTION

PATENT NO. : 6,100,319
DATED : August 8, 2000
INVENTOR(S) : Groth, et al

It is certified that error appears in the above-indentified patent and that said Letters Patent is hereby corrected as shown below:

On the cover page, section [54] "COMPOSITION" should be --COMPOSITIONS--; in section [56] References Cited, U.S. PATENT DOCUMENTS, "Bochmke" should be -- Boehmke--; in column 9, lines 6-11 (Claim 2)

$$\text{"} -CH_2-CO-NH- \atop CH-CO-R$$

α-Form"

should read, $$-- CH-CO-NH- \atop CH_2-CO-R$$

α-Form--.

Signed and Sealed this

Seventeenth Day of April, 2001

Attest:

NICHOLAS P. GODICI

Attesting Officer    Acting Director of the United States Patent and Trademark Office